(12) United States Patent
Wolak

(10) Patent No.: US 6,913,809 B2
(45) Date of Patent: Jul. 5, 2005

(54) LAP SEALABLE FILM WITH A PEEL LAYER

(75) Inventor: Paul Z. Wolak, Indianapolis, IN (US)

(73) Assignee: Pliant Corporation, Schaumberg, IL (US)

( * ) Notice: Subject to any disclaimer, the term of this patent is extended or adjusted under 35 U.S.C. 154(b) by 0 days.

(21) Appl. No.: 10/607,750

(22) Filed: Jun. 27, 2003

(65) Prior Publication Data

US 2004/0023054 A1 Feb. 5, 2004

Related U.S. Application Data

(60) Provisional application No. 60/392,557, filed on Jun. 27, 2002.

(51) Int. Cl.[7] .............................. B32B 7/06; B32B 27/32
(52) U.S. Cl. ..................... 428/35.8; 428/41.8; 428/516; 428/349; 53/469; 53/477
(58) Field of Search ................................ 428/41.8, 516, 428/517, 349, 35.9; 53/469, 477

(56) References Cited

U.S. PATENT DOCUMENTS

| | | | |
|---|---|---|---|
| 4,235,365 A | 11/1980 | Yoshii et al. .................. 229/55 |
| 4,685,591 A | 8/1987 | Schaefer et al. ............. 222/107 |
| 4,886,690 A | 12/1989 | Davis et al. ................. 428/36.6 |
| 4,937,112 A | 6/1990 | Schirmer .................... 428/34.3 |
| 5,037,683 A | 8/1991 | Schirmer .................... 428/36.7 |
| 5,091,241 A | 2/1992 | Lang et al. .................. 428/213 |
| 5,134,001 A | 7/1992 | Osgood ...................... 428/35.2 |
| 5,288,531 A | 2/1994 | Falla et al. ................. 428/35.2 |
| 5,298,302 A | 3/1994 | Boice ........................ 428/34.9 |
| 5,508,051 A | 4/1996 | Falla et al. ................. 426/392 |
| 5,604,043 A | 2/1997 | Ahlgren ....................... 428/518 |
| 5,658,625 A | 8/1997 | Bradfute et al. ............ 428/34.9 |
| 5,679,422 A | 10/1997 | Lind et al. ................. 428/34.8 |
| 5,759,648 A | 6/1998 | Idlas ......................... 428/34.9 |
| 5,759,650 A | * 6/1998 | Raines et al. .............. 428/35.7 |
| 5,804,264 A | * 9/1998 | Bowen ....................... 428/35.2 |
| 5,866,214 A | 2/1999 | Ramesh ....................... 428/34.8 |
| 5,888,648 A | 3/1999 | Donovan et al. ........... 428/349 |
| 5,962,092 A | 10/1999 | Kuo et al. .................. 428/34.9 |
| 5,972,443 A | 10/1999 | Breck et al. ................ 428/35.2 |
| 6,060,136 A | 5/2000 | Patrick et al. .............. 428/35.2 |
| 6,110,600 A | 8/2000 | Ramesh ....................... 428/476.9 |
| 6,117,465 A | 9/2000 | Falla ............................ 426/127 |
| 6,185,908 B1 | 2/2001 | Madderom ..................... 53/415 |
| 6,214,392 B1 | 4/2001 | Ramirez ...................... 426/106 |
| 6,221,410 B1 | 4/2001 | Ramesh et al. ............. 426/105 |
| RE37,171 E | 5/2001 | Busche et al. .............. 383/210 |
| 6,248,380 B1 * | 6/2001 | Kocher et al. .............. 426/127 |
| 6,256,966 B1 | 7/2001 | Braun et al. ................ 53/451 |
| 6,264,098 B1 | 7/2001 | Drummond et al. ...... 229/123.1 |
| 6,274,228 B1 | 8/2001 | Ramesh et al. ............. 428/213 |
| 6,326,068 B1 | 12/2001 | Kong et al. ................ 428/35.2 |
| 6,333,061 B1 | 12/2001 | Vadhar ........................ 426/127 |
| 6,339,912 B1 | 1/2002 | Fahs et al. .................... 53/412 |
| 6,372,274 B2 | 4/2002 | Noel et al. .................. 426/410 |
| 6,406,765 B1 | 6/2002 | Braun et al. ................ 428/35.7 |
| 6,475,578 B1 * | 11/2002 | Gerrits et al. .............. 428/35.7 |
| 2001/0008658 A1 | 7/2001 | Barmore et al. ........... 428/34.3 |
| 2001/0042938 A1 * | 11/2001 | Mackay ...................... 264/154 |
| 2002/0004112 A1 | 1/2002 | Muller et al. ............... 428/35.3 |
| 2002/0006485 A1 | 1/2002 | Bening et al. .............. 428/35.4 |
| 2002/0172834 A1 * | 11/2002 | Rivett et al. ................ 428/515 |

FOREIGN PATENT DOCUMENTS

WO    WO 99/33913     * 8/1999

* cited by examiner

Primary Examiner—D. Lawrence Tarazano
(74) Attorney, Agent, or Firm—Sonnenschein Nath& Rosenthal LLP; Brain R. McGinley

(57) ABSTRACT

A lap sealable film for forming bags on conventional vertical form/fill/seal equipment containing a seal layer and a barrier layer. The seal layer and barrier layer form opposing surfaces of the film. The seal layer contains single site catalyzed polyethylene and is capable of sealing to the barrier layer. The barrier layer comprises a heat resistant and moisture barrier material, such as high density polyethylene or polypropylene.

17 Claims, 5 Drawing Sheets

LAP SEALABLE FILM WITH A PEEL LAYER

RELATED APPLICATIONS

The present application claims priority to Provisional Application Ser. No. 60/392,557 entitled Lap Sealable Film With Single Site Catalyzed Polyethylene, which was filed on Jun. 27, 2002 on behalf of Paul Z. Wolak.

TECHNICAL FIELD

The present invention relates to a film for forming form/fill/seal bags for bag-in-a-box packaging and to bags made from the film. More particularly, the film is capable of forming an easy to open package with a center lap seat.

BACKGROUND OF THE INVENTION

A sealed package or bag placed in a box, referred to as a bag-in-a-box packaging, is conventionally used for applications such as cereal and cracker packaging. The bag acts as a moisture barrier to keep the contents of the bag fresh and the box provides stand up packaging for the shelf. The bag is usually heat sealed along the top and the bottom of the bag. The package is also heat sealed vertically along the center of the package, generally with a fin seal. The bag may be made from a film with a seal layer and a moisture barrier layer. When the bag is formed, the moisture barrier layer is positioned on the outer surface of the bag and the seal layer faces the interior of the bag.

FIG. 1 illustrates a conventional vertical form/fill/seal ("VFFS") machine 10 which is used to form a bag from flat film 20. As shown in FIG. 1, the flat film 20 is wrapped around a filling tube 40 by a bag forming collar 50 and passes downward along the filling tube 40. The film 20 has a seal layer 22 that is positioned adjacent to the filling tube and a moisture barrier layer 24 that faces outward. As the film passes down the filling tube, the right edge 32 of the film is pressed against the left edge 34 of the film, so that the edges of the seal layer face each other. The edges 32, 34 are then folded over to lay flat against the filling tube and a longitudinal sealing device 60 runs along the film edges, forming a fin seal. The film is then advanced past the end of the tube, sealed at the bottom with cross sealing jaws 70, filled with contents and then sealed at the top with the same cross sealing jaws 70. A completed package with a fin seal is illustrated at FIG. 2.

Prior art films for cereal and cracker packaging generally include one surface that is heat sealable and another side that is heat resistant and provides a moisture barrier. The heat sealable surface seals easily to itself in a fin seal, while the heat resistant and moisture barrier layer does not melt on the longitudinal sealing device.

A disadvantage of this conventional method is that a fin seal requires excess film that is simply folded over and does not create volume in the bag. One approach to minimize the amount of film needed to make the package is to use a lap seal. A lap seal can save more than one inch of film along the length of the bag when compared to the film required to form a fin seal. A lap seal is illustrated at FIG. 2. In a lap seal, the inner surface of one edge is sealed to the outer surface of the other edge of the film.

As mentioned above, prior art bag-in-a-box with fin seals are made with a film having a heat sealable layer and a heat resistant layer. Other types of bags with lap seals have been formed from films with seal layers on both surfaces of the film. During the formation of a lap seal with such a film, the layer of the film that contacts a heat sealing device is a seal layer. The sealing device can melt the seal layer and may cause the film to stick to the sealing device. As a result, processing may need to be stopped or conducted more slowly to prevent buildup of film on the sealing device. In addition, the moisture barrier properties of the bag may be reduced because seal layers tend to be more permeable than barrier layers.

Another disadvantage of conventional bag in a box packaging is that the bag can be difficult to open, causing the package to tear instead of opening at the seal when a consumer attempts to open the package.

SUMMARY OF THE INVENTION

The present invention relates to a film for forming form/fill/seal bags for bag-in-a-box packaging and to bags made from the film. More particularly, the film is capable of forming a lap seal on a conventional form/fill/seal apparatus. In one embodiment, the film comprises three layers: a seal layer; a heat resistant, moisture barrier layer; and a peel layer positioned between the seal layer and the barrier layer. The seal layer is an outer layer of the film that is capable of sealing to itself and to the barrier layer. The barrier layer provides a moisture barrier and is heat resistant to protect the film from sticking to film processing equipment during processing. The peel layer is designed to tear within the layer or at its interface with adjacent layers to make a bag of the inventive film easy to open.

The film will tear along the peel layer with a relatively small amount of force, particularly as compared to the force required to tear apart two sections of the film that have been sealed together. As a result, a bag made of the inventive film is easy to open. The peel layer includes a matrix resin, such as low density polyethylene, blended with a peel agent, such as polybutene, ionomer, mineral filler or styrene butadiene.

The peel agent selected depends on the polymer resin used to make up the peel layer. For example, when the peel layer is primarily polyethylene, polybutene may be used to weaken the peel layer. Additional examples and combinations are discussed in more detail below.

The peel agent weakens the peel layer, making it easy to tear when accessing to the contents of the package. The internal strength of the peel layer is weaker than the bond between the sealed layers. As a result, the package will tear open within or along the peel layer providing an easy-open package. While the package will tear open easily, the seals are still strong enough to hold the package together during shipping and storage, as well as preventing tearing open the center lap seal when the top seal package is opened.

The matrix resin in the peel layer may be a polyolefin such as low density polyethylene or ethylene vinyl acetate. The peel layer is positioned between the seal layer and the barrier layer. The film may include additional layers if greater moisture barrier, oxygen barrier, flavor barrier or increased toughness are desired.

The seal layer has a composition that is selected to enable it to seal to the barrier layer. In one embodiment, the seal layer includes polyethylene that is catalyzed with a single site catalyst, also known as metallocene catalyzed polyethylene. The seal layer may comprise metallocene catalyzed polyethylene in an amount that is up to 100% of the seal layer. The seal layer may also include additives for high speed processing, such as linear medium density polyethylene (LMDPE), slip additive and antiblock compound. Such a seal layer is capable of sealing to the barrier layer of the film of the present invention. The barrier layer comprises a suitable polymer that enables the seal layer to seal to the barrier layer, such as high density polyethylene or polypropylene.

The film may be used to create a bag for applications such as cereal or cracker packaging. To form the bag, the seal layer will seal to itself at the top and bottom of the package in a traditional seal. To complete the bag, the seal layer seals to the barrier layer in a lap seal along the center of the bag.

Additional aspects and advantages of this invention will be apparent from the following detailed description of preferred embodiments thereof, which proceeds with reference to the accompanying drawings.

BRIEF DESCRIPTION OF THE DRAWINGS

FIG. 2A illustrates a bag with a center fin seal and a top fin seal and a bottom fin seal.

FIG. 3A illustrates a bag with a center lap seal and a top fin seal and a bottom fin seal.

DETAILED DESCRIPTION OF PREFERRED EMBODIMENTS

Definitions

Figure 1:
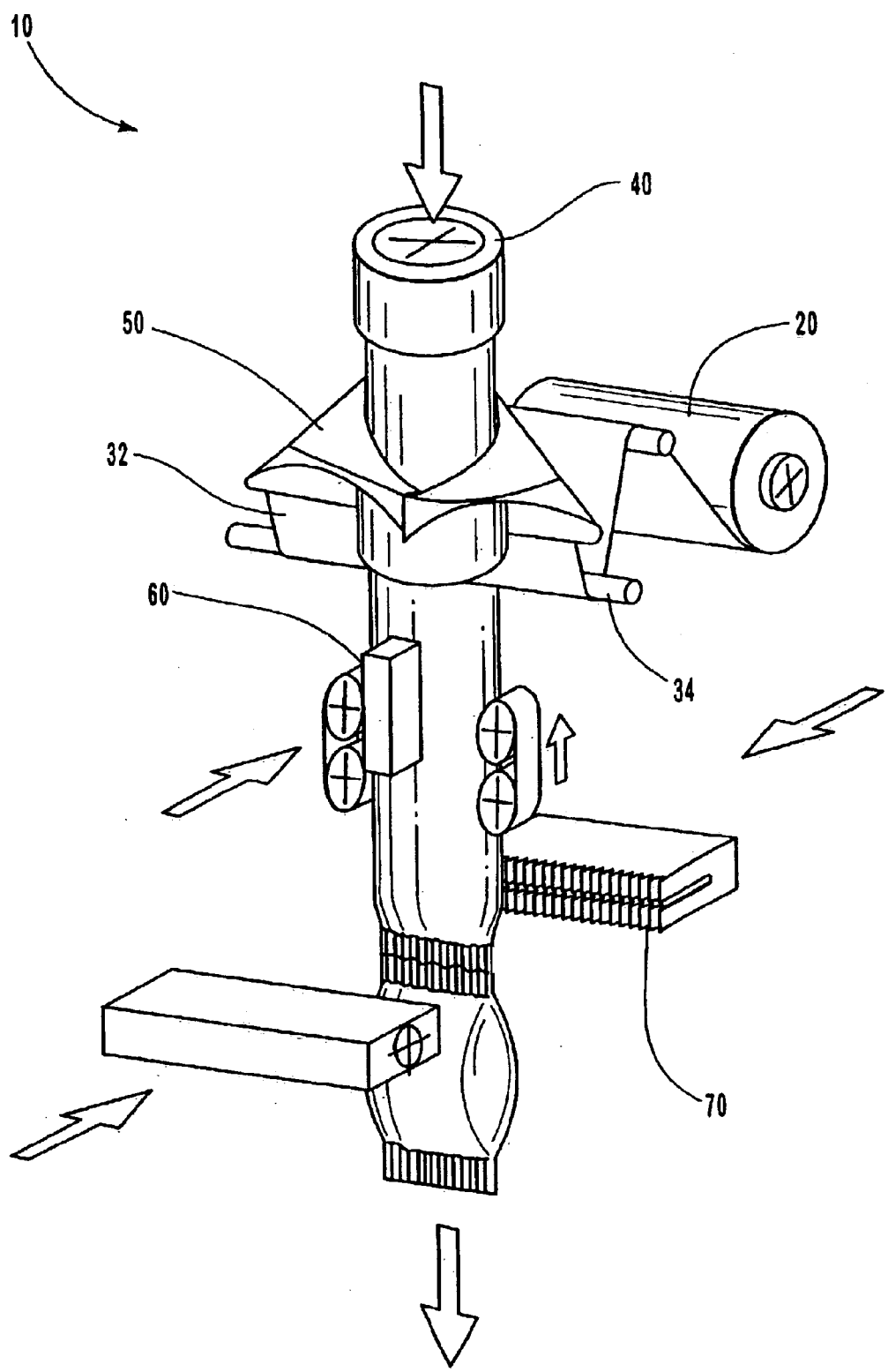
FIG. 1 illustrates a vertical form/fill/seal apparatus to be used in form bag according to the present invention.
Figure 2B:
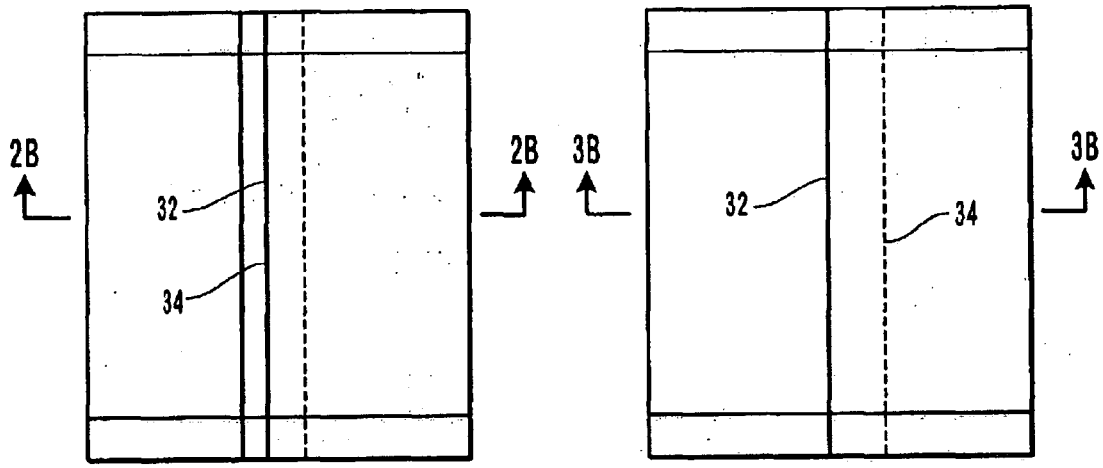
FIG. 2B is a schematic cross section taken along line B—B of the package depicted in FIG. 2B.
Figure 2B:
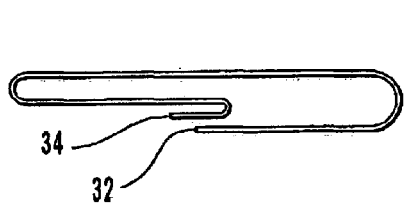

Although more definitions are provided in connection with specific descriptions of embodiments of the film, some of the components suitable for use in embodiments of the film are defined below.

As used herein, the term ethylene vinyl acetate copolymer ("EVA") refers to a copolymer formed from ethylene and vinyl acetate monomers wherein the ethylene derived units (monomer units) in the copolymer are present in major amounts by weight and the vinyl acetate in the copolymer is present in minor amounts by weight.

As used herein, the term ionomer refers to ionomer class materials and include selected molecular weight grades of copolymers such as ethylene/methacrylic acid or ethylene/acrylic acid combined with a metal salt, such as zinc, sodium or lithium, then acid neutralized to create ion clusters. Ionomer resins available from DuPont under the tradename Surlyn are examples of suitable ionomers.

As used herein, the term metallocene polyethylene ("m-PE") refers to any polyethylene manufactured using a single site or metallocene catalyst. Metallocene polyethylene is typically ethylene/alpha olefin copolymer.

As used herein, the phrase low density polyethylene ("LDPE") refers to ethylene homopolymer having a density ranging from about 0.91 g/cm$^3$ to about 0.925 g/cm$^3$. LDPE is typically produced using conventional high pressure process.

As used herein, the phrase linear low density polyethylene ("LLDPE") refers to ethylene alpha-olefin copolymers having a density ranging from about 0.915 g/cm$^3$ to about 0.94 g/cm$^3$. LLDPE can be manufactured using a conventional Ziegler Natta catalyst or a single site catalyst, such as metallocene.

As used herein, the phrase linear medium density polyethylene ("LMDPE") refers to ethylene alpha-olefin copolymers having a density ranging from about 0.925 g/cm$^3$ to about 0.94 g/cm$^3$. LMDPE can be manufactured using conventional Ziegler Natta catalysts or single site catalysts, such as metallocene.

As used herein, the phrase high density polyethylene ("HDPE") refers to ethylene alpha-olefin copolymers or ethylene homopolymer having a density of about 0.94 g/cm$^3$ or greater. HDPE can be produced with several classes of catalysts, such as Ziegler-Natta catalysts and metallocene catalysts.

As used herein, the term polybutene refers to those polymeric entities comprised of butene and another monomeric unit such as ethylene, propylene, 1-hexene, 4-methyl-1-pentene, 1-octene, and 1-decene units, with the butene monomeric unit comprising the major component of the copolymer. This polymer is sometimes referred to as polybutylene.

As used herein, polypropylene refers to those polymeric entities that are propylene homopolymers and propylene copolymers. Propylene copolymers comprise propylene copolymerized with a lesser amount of another monomeric unit, typically ethylene.

In one embodiment, the film is adapted for forming bags for bag-in-a-box packaging. Bag-in-a-box packaging is used for applications such as cereal packages and cracker packages. As described above, bag-in-a-box packaging includes a box so that the product stands up on a store shelf and protects the contents of the packaging from being crushed. The bag provides a moisture barrier to keep the contents fresh.

Specific Embodiments

As discussed above, bags useful for bag-in-a-box packaging may be formed from a flat sheet of film that is wrapped around a filling tube and then sealed. The bag is formed with three seals: a bottom seal; a top seal; and a center lap seal extending between the bottom seal and the top seal.

Figure 4:
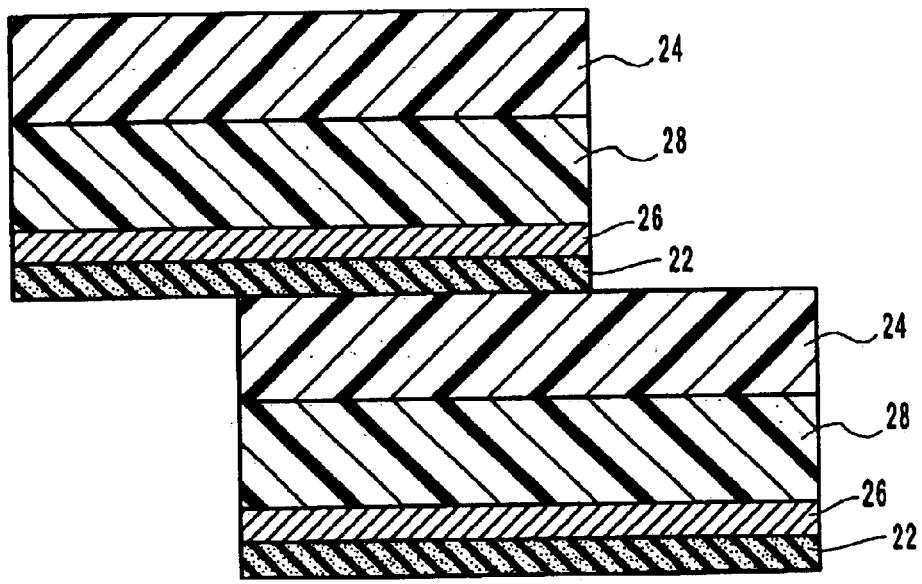
FIG. 4 illustrates a cross sectional view of a three layer embodiment of the inventive film in a lap seal.
Figure 5:
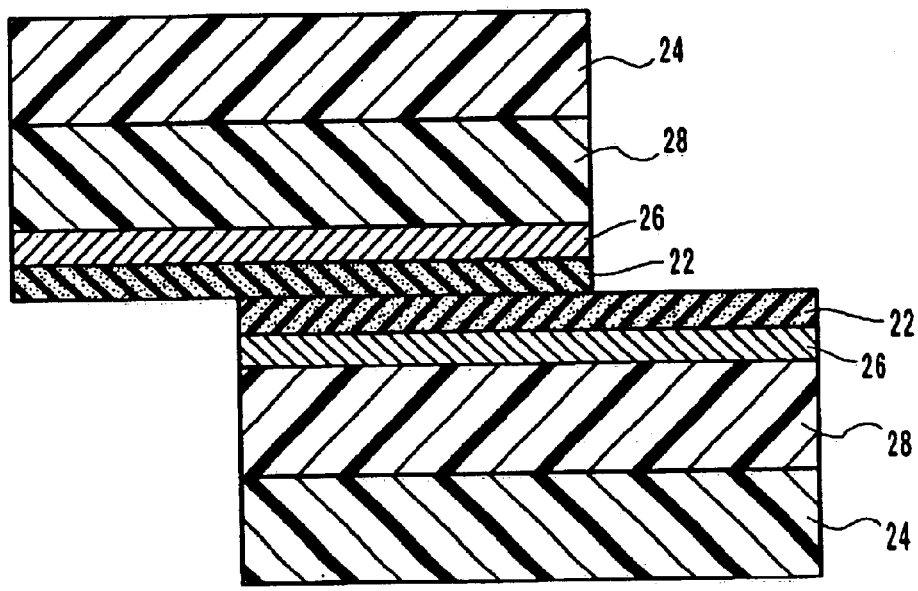
FIG. 5 illustrates a cross section view of a three layer embodiment of the inventive film in a fin seal.
Figure 6:
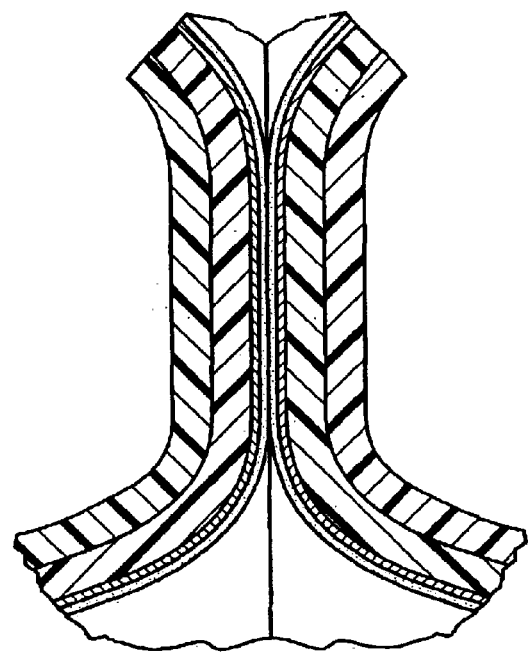
FIG. 6 illustrates a cross section of a top seal of a bag made with an embodiment of the film of the present invention.
Figure 7:
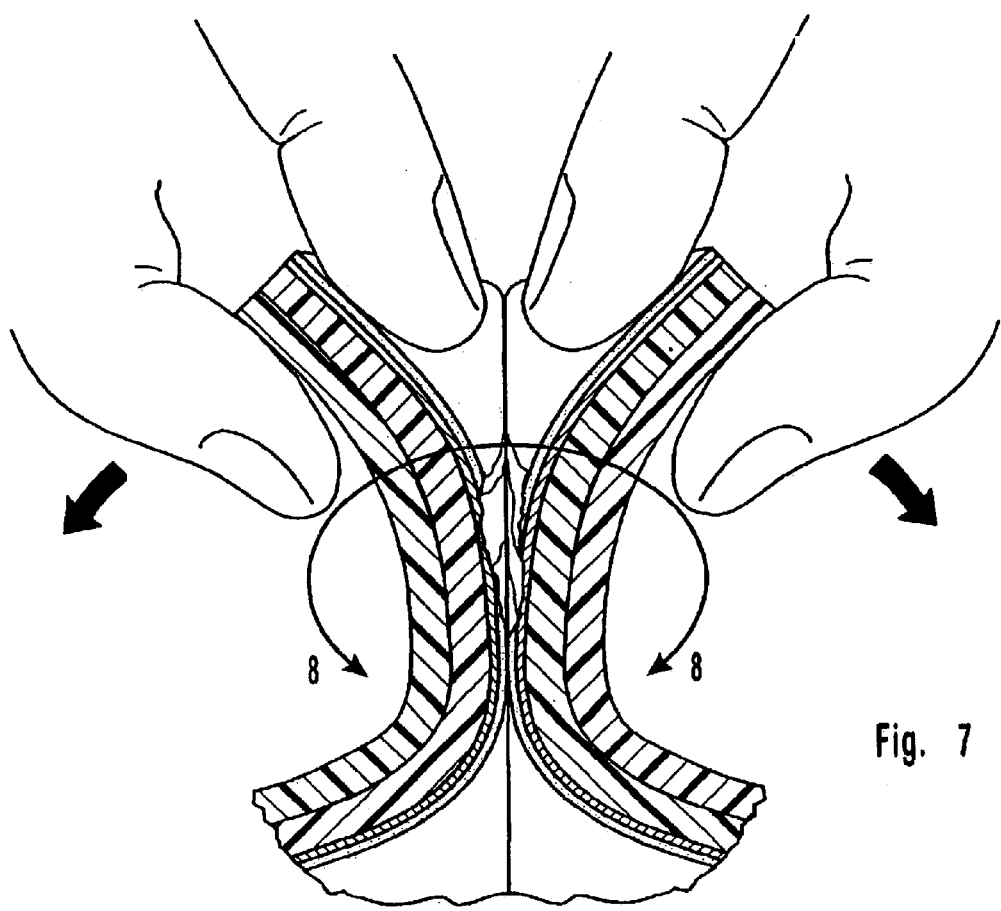
FIG. 7 illustrates a cross section of the top seal shown in FIG. 6, as the top seal is being opened.
Figure 8:
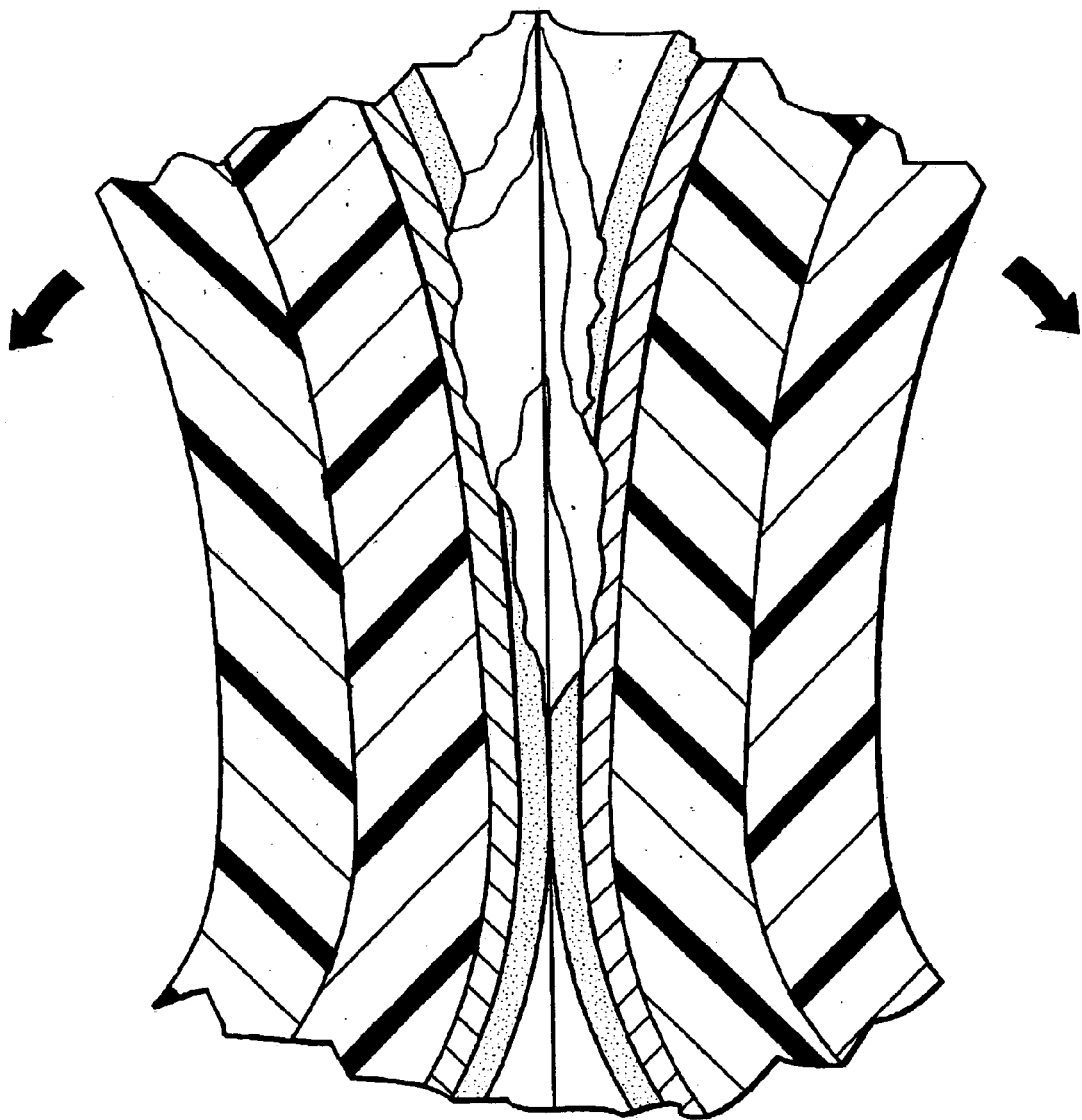
FIG. 8 depicts an enlarged view of the top seal shown in FIG. 7 after the seal has been opened.

As illustrated in FIGS. 3 and 3A, in a lap seal, a first edge of the film overlaps a second edge of the film and the two edges are heat sealed together. FIG. 4 illustrates a cross-section of a lap seal, made with a film having a seal layer 22, a peel layer 26 and two barrier layers 28, 24. As shown in FIG. 4, seal layer 22 is sealed to barrier layer 24. In contrast, FIG. 5 shows a cross section of a fin seal of the same film shown in FIG. 4. In the fin seal, seal layer 22 of one side of the film is sealed to seal layer 22 of another section of the film. FIG. 6 illustrates a top fin seal of a bag formed with film shown in FIGS. 4–5. FIG. 7 shows a cross section of a top fin seal as the seal is being opened. FIG. 8 depicts an enlarged side view showing the top fin seal after the seal has been opened. The seal is formed between the seal layer of the first edge and the barrier layer of the second edge.

The film of the present invention is capable of forming a lap seal without requiring another seal layer because the composition of the seal layer and the composition of the barrier layer enable the seal layer to seal to the barrier layer. As a result, the heat sealing device contacts the barrier layer and not a seal layer. The film is easily processed and the moisture barrier properties of the film are not compromised.

In one embodiment, the film may comprise three layers: a seal layer that forms one surface of the film, a barrier layer that forms the opposite surface of the film and a peel layer that is positioned between the seal layer and the barrier layer. The seal layer comprises a single site catalyzed polymer that will seal to the barrier layer of a material such as high density polyethylene. The peel layer provides a bag made of the film with an easy to open top seal. The strength of the bond between the peel layer and the layers adjacent to the peel layer are generally sufficiently strong so that the bag is held together during shipping, storage and so the lap seal remains intact when a top seal of the bag is opened while the bag is in a box.

The peel layer comprises a matrix resin that creates a matrix in the peel layer. The peel layer further comprises a peel agent that is distributed throughout the matrix and causes the peel layer to weaken. If the peel agent is partially concentrated at the surface of the peel layer, the peel agent will weaken the seal between the peel layer and an adjacent layer, causing the peel layer to separate from the adjacent layer. Where the peel agent is distributed throughout the peel layer, the peel layer will be weakened so that the peel layer will come apart. FIG. 8 shows a top seal torn apart, with peel layer 26 on one side of the seal separating away from adjacent layers 28, 22 or separating within itself. The peel agent forms: microscopic irregularities in the polymer matrix, making the peel layer easy to tear when the film is formed into a bag. As a result, the top seal or a bag formed of an embodiment of the film may be torn open with a force of less than about 2 lbs/in.

Examples of suitable peel agents include polybutene, ionomer, styrene butadiene, polypropylene and mineral filler. Examples of suitable polymer resins include polyethylene homopolymer, polyethylene copolymer and EVA. The selection of the peel agent and the amount of peel agent depends on the polymer resin in the peel layer. The amount of peel agent in the layer also depends upon the desired resistance to opening.

Suitable polybutene resins include those sold by Basell under the tradename PB8640 and PB16000SA. Suitable ionomers include those made by Dupont under the tradenames Surlyn 1650 and Surlyn 1601. Suitable ethylene vinyl acetate resins include the resin may be Dupont under the tradename Elvax 3169Z. Suitable styrene butadiene resins include the resin made by Phillips under the tradename K Resin KR05. Suitable polypropylene resins include those made by Huntsman under the tradename P9H8M015 and by Exxon under the tradename 4403.E1. Suitable mineral fillers include diatomaceous earth sold by Polyfil under the tradename ABC 5000 and the talc sold by Polyfil under the tradename MT5000.

Examples of suitable matrix resins include low density polyethylene, linear low density polyethylene, metallocene low density polyethylene, ethylene vinyl acetate, or ionomer. Suitable polymer resins for use in the peel layer include the LDPE sold by Equistar under the tradename Petrothene M2520, the LLDPE sold by Dow under the tradename Dowlex 2045, the mLLDPE sold by Dow under the tradename Elite 5400, the EVA sold by Dupont under the tradenames Elvax 3169Z, and the ionomer sold by Dupont under the tradename Surlyn 1650.

In one embodiment, the matrix resin in the peel layer comprises polyethylene and the peel agent comprises polybutene. The amount of polybutene in the peel layer may be adjusted depending on the desired level of force required to tear open a bag made of the film. As the amount of polybutene in the peel layer is increased, the ease of tearing apart two sections of the film sealed together also increases.

In general, the peel layer may contain sufficient polybutene such that the internal strength of the peel layer is weaker than the bond between the seal layers. As a result, a bag formed on conventional form fill seal equipment with an embodiment of the film will tear open within the peal layer providing an easy-open package. A bag of one embodiment of the film will tear open with the application of less than 2.5 lbs./in of force. A bag of another embodiment of the film will tear open with the application of less than 2 lbs./in of force. In another embodiment, the seal at the top and bottom of the bag, in which the inside of the film is sealed to itself, is easily opened at a range of about 1 lbs/in. to about 2 lbs/in of force. This easy open feature is retained regardless of the packaging machine setting because the film composition dictates the force required to open the bag. The force required to tear apart two sections of film that have been sealed together is measured by pulling apart a 1-inch wide strip at 10 inches per minute on a conventional tensile testing machine, such as an Instron.

The level of peel agent should be sufficient to allow easy opening of a top seal, but still low enough so that the lap seal is sufficiently strong to resist being opened along its length when the top seal of the bag is opened inside a box, such as a cereal box. Stated otherwise, the force required to open the top seal, when applied to the top seal, does not cause the lap seal to open down its length. In the case of a bag-in-a-box packaging, the box will typically prevent a user from exerting excessive force far beyond the force necessary to open the top seal.

The peel layer may contain polybutene in an amount ranging from greater than 15% to about 30% by weight of the peel layer, depending on the desired properties of the film. In another embodiment, the peel layer comprises polybutene in an amount greater than 15%. In yet another embodiment, the peel layer comprises polybutene in an amount ranging from 16% to about 20% by weight of the peel layer. In one embodiment, the peel layer contains polybutene in amount greater than about 18% by weight of the peel layer. In another embodiment, the peel layer contains polybutene in an amount greater than about 20% by weight of the peel layer. The peel layer may contain polybutene in an amount greater than any number ranging from 16% to about 25% by weight of the peel layer. In one embodiment, the matrix resin blended with polybutene is LDPE.

In another embodiment, the peel agent comprises ionomer and the matrix resin comprises polyethylene or ethylene vinyl acetate blended. In one such embodiment, the amount of ionomer ranges from about 20% to about 50% of the peel layer. In another embodiment, the amount of ionomer is greater than about 20% by weight of the peel layer. Another embodiment comprises ionomer in an amount ranging from about 25% to about 40% by weight of the peel layer. For example, the peel layer may contain polybutene in an amount greater than about 17% by weight of the peel layer, greater than 20% by weight of the peel layer or greater than 25% by weight of the peel layer. In one embodiment, the matrix resin used in the peel layer with ionomer is LDPE.

In another embodiment, the peel agent comprises polypropylene and the matrix resin comprises LDPE. Such a peel layer may comprise LDPE in an amount ranging from about 60% to about 90% by weight of the peel layer and polypropylene in an amount ranging from about 10% to about 40% by weight of the peel layer.

In yet another embodiment, the peel agent comprises mineral filler and the matrix resin comprises polyethylene.

In one embodiment, the polymer is LDPE. The peel layer may comprise mineral filler in an amount ranging from about 20% to about 40% by weight of the peel layer. In another embodiment, the peel layer may comprise mineral filler in an amount greater than about 15% by weight of the peel layer.

The seal layer comprises polyethylene, such as LLDPE or LDPE. In one embodiment, the seal layer may comprise m-PE in an amount that is up to 100% of the seal layer. The m-PE used in the seal layer preferably has a melt index ranging from about 0.5 to about 4 g/10 minutes. In one embodiment, the m-PE has melt index ranging from about 1 to about 3.5 g/10 minutes. In yet another embodiment, density ranging from about 0.880 to about 0.915 g/cm$^3$. In yet another embodiment, the m-PE has a density from about 0.885 to about 0.905 g/cm$^3$. The melting point of the m-PE ranges from about 90° C. to about 130° C. The melting point of the m-PE is lower than the melting point of the polymer in the barrier layer. Examples of suitable m-PE resins include those sold by Dow Chemical under the tradename Affinity PF1140 or Attane 4203 or those sold by ExxonMobil under the tradename Exact 4151.

The m-PE can be prepared through the use of a metallocene catalyst, and/or any single site catalyst. Furthermore, the m-PE can be prepared in accordance with any suitable polymerization process, including slurry polymerization, gas phase polymerization, and high pressure polymerization processes. U.S. Pat. No. 6,060,136, U.S. Pat. No. 5,206,075, U.S. Pat. No. 5,241,031, and PCT International Application WO 93/03093, which are hereby incorporated by reference, disclose methods for making polymers with single site catalysts.

In addition to the m-PE, the seal layer may include additives for high speed processing, such as polyethylene processing aids, slip additive and antiblock compound. The seal layer may contain a polyethylene processing aid in an amount ranging from about 5% to about 15% by weight of the seal layer. In a preferred embodiment, the seal layer contains polyethylene processing aid in an amount of about 7% by weight of the peel layer. Suitable polyethylene processing aids include linear low density polyethylene, low density polyethylene, medium density polyethylene, linear medium density polyethylene, and high density polyethylene. For example, the resin sold by Dow under the tradename Dowlex 2036C may be used as a polyethylene processing aid.

Slip additives lubricate the film, so that the film slides along machinery more easily when the film is formed into bags. The seal layer may contain a slip additive in an amount ranging from about 5% to about 12% of the seal layer. In one embodiment, the seal layer contains a slip additive in amount of about 8% by weight of the seal layer. Suitable slip additives include those sold by Ampacet under the tradename 10090.

The seal layer may further contain an antiblock compound in an amount ranging from about 2% to about 6% by weight of the seal layer. In one embodiment, the seal layer contains antiblock compound in an amount of about 3% by weight of the seal layer. A suitable example of an antiblock compound includes the antiblock compound sold by Polyfil under the tradename ABC5000.

The seal layer may have any thickness sufficient to provide the desired sealing strength. In one embodiment, the seal layer has a thickness of at least about 0.10 mil. In another embodiment, the seal layer has a thickness of about 0.15 mil.

A barrier layer is positioned as an outer layer of the film on the surface opposite the seal layer. The barrier layer contains a polymer or mix of polymers that provide good moisture resistance and heat resistance and that are capable of sealing to the seal layer. The polymer or mix of polymers in the barrier layer has a melt point range that is higher than the melt point range of the polymer or mix of polymers used in the seal layer. When a heat sealing device contacts the barrier layer to seal the seal layer to the barrier layer, the difference in melt points permits the barrier layer to stay intact and to protect the film while the seal layer melts. The barrier layer also provides the film with good moisture barrier properties which are discussed in detail below. The film may contain up to 100% of a polymer resin. Suitable resins for use in the barrier layer include high density polyethylene and polypropylene. In an embodiment with a polypropylene barrier layer that forms the exterior of the film, a layer of EVA may be used adjacent to the polypropylene barrier layer. In one embodiment, the barrier layer comprises high density polyethylene, that is an ethylene homopolymer and has a density of at least about 0.940 g/cm$^3$. Suitable resins for use in the barrier layer include those sold by Equistar under the tradenames Alathon M6210, M6020, L4907 and L5885, by Chevron under the tradenames Marlex 9662, Marlex 9659 and mPact D449, and by Dow under the tradename Inspire DC112.

The thickness of the barrier layer may vary depending on the desired moisture vapor transmission rate ("MVTR") and the desired oxygen transmission rate ("OTR"). The barrier layer or layers may have a thickness greater than the thicknesses of the seal layer and the peel layer. Films with a barrier layer that is 84% of the thickness of the film, a seal layer that is 8% of the thickness of the film and a peel layer that is 8% of the thickness of the film have varying properties depending on the total thickness of the film. A film of this embodiment with a total thickness of 1 mil has a MVTR of about 0.30 g/100 in$^2$/24 hours at 100° F./90% relative humidity ("RH"). A film of this embodiment with a thickness of about 2 mil has a MVTR of about 0.15 g/100 in$^2$/24 hours at 100° F./90% RH. An embodiment of the film with a thickness of about 3 mils has a MVTR of about 0.09 g/100 in$^2$/24 hours at 100° F/90% RH. Similarly, oxygen transmission rate ("OTR") decreases as film thickness increases. The film having a thickness of 1.0 mil film has an OTR of about 140 cc/100 in$^2$/24 hours at 73° F. and 100% O$_2$. The film having a thickness of about 1.5 mil film has an OTR of 93 cc/100 in$^2$/24 hours at 73° F. and 100% O$_2$. The film having a thickness of 2.0 mils has an OTR of 70 cc/100 in$^2$/24 hours at 73° F. and 100% O$_2$ while the film having a thickness of 3.0 mils has an OTR of about 48 cc/100 in$^2$/24 hours at 73° F. and 100% O$_2$.

The film may contain more than three layers. For example, a four layer film may include an additional barrier layer to provide the film with added moisture barrier, oxygen barrier, toughness, flavor barrier and toughness. In a five layer embodiment, the film includes a seal layer, a peel layer and three polyethylene barrier layers. In a seven layer embodiment, the film includes five polyethylene barrier layers in addition to the seal layer and the peel layer.

In another embodiment, the film may include the following layers: (1) an outer polyethylene layer, preferably HDPE; (2) an ethylene vinyl alcohol (EVOH) layer with tie layers adjacent to both sides of the ethylene vinyl alcohol layer; (3) a polyethylene layer, preferably HDPE; (4) a peel layer; and (5) a seal layer. Additional HDPE barrier layers can be used to increase moisture barrier properties. An ethylene vinyl alcohol layer may be used to provide additional oxygen, aroma and flavor barriers for the package. In one embodiment, at least one additional barrier layer of LMDPE, m-PE, LLDPE may be used to provide increased toughness. Alternatively, the film may contain a layer of an engineered polymer, nylon polyester in addition to or instead of an ethylene vinyl alcohol layer.

The inventive film may have any thickness required for the desired barrier properties for the completed packaging. Film typically used to form bag for applications such as cereal packaging and cracker packaging have thicknesses ranging from about 1 mil to about 5 mils, more typically about 1.5 mil to about 3 mils. As discussed above, the greater the film thickness the lower the MVTR and OTR.

The films in accordance with the present invention can be manufactured using film fabrication technologies well-known in the art. For example, the barrier layer may be extruded into a film using a flat die, or extruded into a film using an annular die, and the seal layer formed thereon by solvent deposition, lamination or coextrusion techniques. However, the preferred method of manufacture of the multilayer film of the present invention is via simultaneous coextrusion, of all the layers of the multilayer film, including the seal layers, the barrier layer, the peel layer and any additional layers.

The film may be used to create a bag on conventional form/fill/seal machinery for applications such as cereal or cracker packaging. FIG. 1 shows a side view of a bag with fin seals at the top edge and bottom edge of the bag. The bag shown in FIG. 3A has a lap seal along the front of the bag. To form the bag, the seal layer is sealed to itself at the top and bottom of the package in a traditional fin seal. To complete the bag, the seal layer is sealed to the barrier layer in a lap seal at the center of the bag.

FIG. 4 illustrates a cross section of a four layer embodiment of the present invention in a lap seal. As shown in FIG. 4, the film includes an outer HDPE barrier layer 24, a second barrier layer 28, a peel layer 26, and a seal layer 22. In the lap seal, the seal layer is sealed to the outer barrier layer. The outer barrier layer provides the film with desirable barrier and strength properties. In addition, the compositions of the seal layer and barrier layer permit the barrier layer and seal layer to be sealed together with sufficient strength for conventional uses of bags in boxes such as holding cereal.

FIG. 5 shows a cross section of a four layer embodiment in a fin seal. In the fin seal, the seal layer 22 is sealed to itself. As mentioned above, when force is applied to open a bag made of the film, the film will tear along the peel layer 26 instead of along the seal.

Figure 3B:
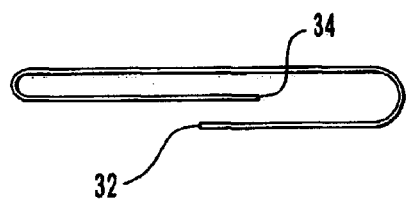
FIG. 3B is a schematic cross section taken along line B—B of the package depicted in FIG. 3A.

The film of the present invention may be used to form packages such as the bag shown in FIGS. 3A–3B on existing vertical or horizontal form/fill/seal packaging equipment. As discussed above, FIG. 1 illustrates a conventional vertical form/fill/seal ("VFFS") equipment 10 which is used to form a bag from flat film 20. Although the equipment illustrated in FIG. 1 is discussed above with reference to forming prior art bags, similar equipment may be utilized to form a bag with a center lap seal. As shown in FIG. 1, the flat film 20 is wrapped around a filling tube 40 by a bag forming collar 50 and passes downward along the steel tube 30. The film 20 has a seal layer 22 that is placed adjacent to the steel tube and a moisture barrier layer 24 that faces outward. The seal layer 22 forms the interior surface of the bag while the barrier layer 24 forms the exterior surface of the bag.

In forming a lap seal, the film passes down the filling tube and the right edge 42 of the film positioned to overlap the left edge 34 of the film. A longitudinal sealing device 60 runs along the overlapped edges, forming a fin seal. The film is then advanced past the end of the tube, sealed at the bottom with cross sealing jaws 70, filled with contents and then sealed at the top with the same cross sealing jaws 70. A completed package with a center lap seal is illustrated at FIG. 3. While the film of the present invention has been described with reference to packaging bags for bag-in-a-box packaging, the film is not limited to use in connection with such packaging.

EXAMPLES

Example 1

A bag was made of an embodiment of the film having seven coextruded layers of the composition shown below.

| Layer | % Thickness | Polymer Type | % By Wt. of Layer | Melt Index (g/10 min.) | Density (g/cm³) |
|---|---|---|---|---|---|
| A | 8.0 | mPE | 50 | 1.6 | 0.895 |
| | | mPE | 41 | 3.0 | 0.875 |
| | | Antiblock | 3 | | 1.280 |
| | | slip additive | 6 | 5.0 | 0.915 |
| B | 8 | LDPE | 80 | 2.0 | 0.925 |
| | | PB | 18 | 1.0 | 0.908 |
| | | slip additive | 2 | 5.0 | 0.915 |
| C | 10 | LMDPE | 100 | 2.5 | 0.935 |
| $D_1$ | 10 | HDPE | 100 | 1.0 | 0.958 |
| $D_2$ | 10 | HDPE | 100 | 1.0 | 0.958 |
| $D_3$ | 27 | HDPE | 100 | 1.0 | 0.958 |
| $D_4$ | 27 | HDPE | 100 | 1.0 | 0.958 |

The seal layer, A, with a melting point of about 95° C. to about 97° C. was capable of sealing to the exterior layer, D4, with a melting point of about 132° C. to about 133° C., in a lap seal. The lap seal was formed by applying a sealing bar to the exterior of the bag, against layer D4. The temperature of the sealing bar was about 121° C. (250° F.) and was held in place for about 1 second under 50 psi of pressure. The lap seal was formed without causing the exterior HDPE layer, D4 to melt and stick to the sealing bar. A top fin seal and a bottom fin seal were formed under the same conditions. The fin seals could be opened with the application of about 1.5 to about 2.0 lbs/inch, tested by pulling a 1 inch wide strip apart at 10 inches per minute on a conventional tensile testing machine, such as an Instron. In addition, the lap seal was sufficiently strong so that the fin seal could be opened without disrupting the integrity of the lap seal.

The fin seals, when opened, separated along the peel layer, B, of one side of the seal, as shown in FIG. 8. The peel layer, in some instances, comes apart within the layer and, in other instances peels away from the adjacent layer.

Example 2

Example 2 has the composition identified for Example 1, except that the peel layer, B, has the following composition: ethylene vinyl acetate in an amount of 60% by weight of the peel layer, peel additive in an amount of 15% by weight of the peel layer, mineral filler in an amount of 23% by weight of the peel layer and slip additive, in an amount of 2% by weight of the peel layer. Examples of suitable peel additives include polypropylene or HDPE. A bag formed of the film composition of Example 2, with a top seal, a bottom seal and a lap seal, would be expected to open easily, with the application of less about 2 lbs/inch of force. The top seal would be expected to open without disrupting the integrity of the lap seal.

Example 3

Example 3 has the composition described for Example 1, except that the peel layer, B, has the following composition: ionomer in an amount of 35% by weight of the peel layer and LDPE in an amount of 65% by weight of the peel layer. A bag formed of the film composition of Example 3, with a top seal, a bottom seal and a lap seal, would be expected to open easily, with the application of less about 2 lbs/inch of force. The top seal would be expected to open without disrupting the integrity of the lap seal.

Example 4

Example 4 has the composition described for Example 1, except that the peel layer, B, has the following composition: ionomer in an amount of 30% by weight of the peel layer and EVA in an amount of 70% by weight of the peel layer. A bag formed of the film composition of Example 3, with a top seal, a bottom seal and a lap seal, would be expected to open easily, with the application of less than about 2 lbs/inch of force. The top seal would be expected to open without disrupting the integrity of the lap seal.

Example 5

Example 5 has the composition described for Example 1, except that the peel layer, B, has the following composition: styrene butadiene in an amount of 20% by weight of the peel layer and LDPE in an amount of 80% by weight of the peel layer. A bag formed of the film composition of Example 3, with a top seal, a bottom seal and a lap seal, would be expected to open easily, with the application of less about 2 lbs/inch of force. The top seal would be expected to open without disrupting the integrity of the lap seal.

It will be obvious to those having skill in the art that many changes may be made to the details of the above-described embodiments of this invention without departing from the underlying principles thereof. The scope of the present invention should, therefore, be determined only by the following claims.

What is claimed is:

1. A film for forming a bag with a lap seal, a top seal and a bottom seal, the film comprising:
    a seal layer, wherein the seal layer includes metallocene catalyzed polyethylene,
    a barrier layer opposite from the seal layer such that seal layer and the barrier layer provide opposing exterior surfaces of the film,
    a peel layer positioned between the seal layer and the barrier layer, said peel layer comprising mineral filler and a matrix polymer,
    wherein the seal layer has a seal layer melting point and the barrier layer has a barrier layer melting point that is higher than the seal layer melting point,
    wherein the seal layer is capable of sealing to the barrier layer at a temperature below the barrier layer melting point, to enable the lap seal to be formed between the barrier layer and the seal layer when the film in formed into a bag, and
    wherein the seal layer is capable of sealing to itself at a temperature below the barrier layer melting point.

2. A film for forming a bag with a lap seal, a top seal and a bottom seal, the film comprising:
    a seal layer, wherein the seal layer includes metallocene catalyzed polyethylene,
    a barrier layer opposite from the seal layer such that seal layer and the barrier layer provide opposing exterior surfaces of the film,
    a peel layer positioned between the seal layer and the barrier layer, said peel layer comprising styrene-butadiene and a matrix polymer,
    wherein the seal layer has a seal layer melting point and the barrier layer has a barrier layer melting point that is higher than the seal layer melting point,
    wherein the seal layer is capable of sealing to the barrier layer at a temperature below the barrier layer melting point, to enable the lap seal to be formed between the barrier layer and the seal layer when the film in formed into a bag, and
    wherein the seal layer is capable of sealing to itself at a temperature below the barrier layer melting point.

3. A film for forming a baa with a lap seal, a top seal and a bottom seal, the film comprising:
    a seal layer, wherein the seal layer includes metallocene catalyzed polyethylene,
    a barrier layer opposite from the seal layer such that seal layer and the barrier layer provide opposing exterior surfaces of the film,
    a peel layer positioned between the seal layer and the barrier layer, said peel layer comprising ionomer and a matrix polymer,
    wherein the seal layer has a seal layer melting point and the barrier layer has a barrier layer melting point that is higher than the seal layer melting point,
    wherein the seal layer is capable of sealing to the barrier layer at a temperature below the barrier layer melting point, to enable the lap seal to be formed between the barrier layer and the seal layer when the film in formed into a bag, and
    wherein the seal layer is capable of sealing to itself at a temperature below the barrier layer melting point.

4. A film for forming a baa with a lap seal, a top seal and a bottom seal, the film comprising:
    a seal layer, wherein the seal layer includes metallocene catalyzed polyethylene,
    a barrier layer opposite from the seal layer such that seal layer and the barrier layer provide opposing exterior surfaces of the film,
    a peel positioned between the seal layer and the barrier layer, said peel layer comprising polypropylene and a matrix polymer,
    wherein the seal layer has a seal layer melting point and the barrier layer has a barrier layer melting point that is higher than the seal layer melting point,
    wherein the seal layer is capable of sealing to the barrier layer at a temperature below the barrier layer melting point, to enable the lap seal to be formed between the barrier layer and the seal layer when the film in formed into a bag, and
    wherein the seal layer is capable of sealing to itself at a temperature below the barrier layer melting point.

5. The film as recited in any of claims 1 through 4, wherein the barrier layer contains a polymer selected from the group consisting of high density polyethylene and polypropylene.

6. The film as recited in any of claims 1 through 4, wherein the barrier layer contains high density polyethylene, and wherein the high density polyethylene is a homopolymer of ethylene.

7. The film as recited in claim 1, wherein the high density polyethylene has a density of at least about 0.940 g/cm$^3$.

8. The film as recited in any of claims 1 through 4, wherein the barrier layer provides the film with a moisture vapor transmission rate of less than about 0.25 g/100 in²/24 hours at 100° F./90% relative humidity.

9. The film as recited in any of claims 1 through 4, wherein the peel layer is adapted to enable the film, when sealed to itself, to be pulled apart with the application of less than about 2 pounds per inch of force.

10. A film for forming a bag with a lap seal, a top seal and a bottom seal, the film comprising:
  a seal layer, wherein the seal layer includes a single site catalyzed polyethylene,
  a barrier layer oppose from the seal layer such that seal layer and the barrier layer provide opposing exterior surfaces of the film,
  a peel layer position between the seal layer and the barrier layer, wherein the peel layer comprises a matrix resin and polybutene in an amount ranging from between about 15% to about 20% by weight of the peel layer,
  wherein the seal layer has a seal layer melting point and the barrier layer has a barrier layer melting point that is higher than the seal layer melting point,
  wherein the seal layer is capable of sealing to the barrier layer at a temperature below the barrier layer melting point, to enable the lap seal to be formed between the barrier layer and the seal layer when the film is formed into a bag, and
  wherein the seal layer is capable of sealing to itself at a temperature below the barrier layer melting point.

11. A film for forming a bag with a lap seal, a top seal and a bottom seal, the film comprising:
  a seal layer, wherein the seal layer includes a single site catalyzed polyethylene,
  a barrier layer oppose from the seal layer such that seal layer and the barrier layer provide opposing exterior surfaces of the film,
  a peel layer position between the seal layer and the barrier layer, wherein the peel layer comprises a matrix resin and polybutene in an amount greater than 1 5%,
  wherein the seal layer has a seal layer melting point and the barrier layer has a barrier layer melting point that is higher than the seal layer melting point,
  wherein the seal layer is capable of sealing to the barrier layer at a temperature below the barrier layer melting point, to enable the lap seal to be formed between the barrier layer and the seal layer when the film is formed into a bag,
  wherein the seal layer is capable of sealing to itself at a temperature below the barrier layer melting point, and
  wherein the polymer matrix in the peel layer is low density polyethylene.

12. A bag comprising:
  a film comprising a peel layer between a seal layer and barrier layer, the peel layer comprising a matrix resin and a peel agent,
  wherein the bag is configured such that the barrier layer of the film is the exterior surface of the bag and the seal layer is the interior surface of the bag,
  wherein the bag has a top seal, a bottom seal and a lap seal extending between the top seal and the bottom seal,
  wherein the seal layer and the barrier layer have compositions that enable the lap seal to be formed by sealing a portion of the seal layer at one end of the film to a portion of the barrier layer at an opposing end of the film,
  wherein the seal layer is capable of sealing to itself at a temperature below the barrier layer melting point, and
  wherein the seal layer and barrier layer are capable of forming a lap seal that is resistant to being opened along its length when the top seal of the bag is opened.

13. The bag recited in claim 12, wherein the seal layer comprises a single site catalyzed ethylene alpha olefin copolymer.

14. The bag recited in claim 12, wherein the barrier layer contains a polymer selected from the group consisting of high density polyethylene and polypropylene.

15. The bag recited in claim 12, wherein the bag may be opened with the application of force less than 2 pounds per inch.

16. A method of forming a bag with a form/fill/seal apparatus, the method comprising:
  providing a film having a peel layer positioned between a seal layer and a barrier layer, wherein the film has a first edge and a second edge,
  configuring the film such that the barrier layer of the film forms the exterior surface of the bag and the seal layer forms the interior surface of the bag,
  forming a bottom seal,
  forming a lap seal by sealing the seal layer along the first edge of the film to the barrier layer along the second edge of the film,
  forming a top seal,
  wherein the seal layer and the barrier layer have compositions that enable the seal layer to seal to the barrier layer, and
  wherein the peel layer enables the top seal to be opened without also opening the lap seal along its length.

17. The method as recited in claim 16, wherein the barrier layer contains a polymer selected from the group consisting of high density polyethylene and polypropylene.

* * * * *